United States Patent
Doets et al.

(10) Patent No.: US 8,650,603 B2
(45) Date of Patent: Feb. 11, 2014

(54) PLAYING OUT INTERLUDES BASED ON PREDICTED DURATION OF CHANNEL-SWITCHING DELAY OR OF INVOKED PAUSE

(75) Inventors: Peter-Jan Doets, Delft (NL); Anton Havekes, Schiedam (NL); Robert-Ernst Kooij, Delft (NL); Martin Prins, The Hague (NL); Victor Klos, The Hague (NL); Hans Maarten Stokking, Wassenaar (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 13/257,503

(22) PCT Filed: Apr. 1, 2010

(86) PCT No.: PCT/EP2010/054433
§ 371 (c)(1), (2), (4) Date: Sep. 19, 2011

(87) PCT Pub. No.: WO2010/112591
PCT Pub. Date: Oct. 7, 2010

(65) Prior Publication Data
US 2012/0011545 A1    Jan. 12, 2012

(30) Foreign Application Priority Data

Apr. 2, 2009 (EP) ................................. 09004876
Jan. 27, 2010 (EP) ................................. 10151839

(51) Int. Cl.
*H04N 7/173*    (2011.01)
*G06F 3/00*     (2006.01)
*G06F 13/00*    (2006.01)
*H04N 5/445*    (2011.01)
*H04N 7/20*     (2006.01)
*H04N 7/16*     (2011.01)

(52) U.S. Cl.
USPC ................... 725/94; 725/37; 725/38; 725/57; 725/68; 725/85; 725/91; 725/92; 725/93; 725/95; 725/96; 725/100; 725/110; 725/120; 725/131; 725/139; 725/151

(58) Field of Classification Search
USPC ........... 725/32–36, 94–96, 37, 38, 57, 68, 85, 725/91, 92, 93, 100, 110, 120, 131, 139, 725/151
See application file for complete search history.

(56) References Cited

U.S. PATENT DOCUMENTS 5,786,845 A    7/1998   Tsuria
(Continued)

FOREIGN PATENT DOCUMENTS

EP    0594350    12/1998
(Continued)

OTHER PUBLICATIONS

"Digital Cellular Telecommunications System (Phase 2+); Universal Mobile Telecommunications System (UMTS); LTE; IP Multimedia (IM) Subsystem Sh Interface; Signalling Flows and Message Contents (3GPP TS 29.328 version 9.6.0 Release 9)", ETSI TS 129 328 V9.6.0, Jun. 2011, pp. 1-51.

(Continued)

*Primary Examiner* — Pankaj Kumar
*Assistant Examiner* — Alazar Tilahun
(74) *Attorney, Agent, or Firm* — McDonnell Boehnen Hulbert & Berghoff LLP

(57) ABSTRACT

When the user initiates the retrieval of the primary content information item by means of entering a user input into the data processing system, e.g. zapping a digital TV that switches channels upon receipt of the user input, he/she has to wait a noticeable time before the rendering and play-out of the primary content information item actually starts. The length of the delay is predicted, on the basis of which one or more secondary content items are rendered and played out to the user during this delay. The invention can also be used for bridging the waiting time in an online ordering system, when loading a program on a personal computer, and in an IMS-based IPTV network.

8 Claims, 6 Drawing Sheets

(56) References Cited

U.S. PATENT DOCUMENTS

| | | | |
|---|---|---|---|
| 6,340,987 | B1 | 1/2002 | Hayashi |
| 6,473,137 | B1 | 10/2002 | Godwin et al. |
| 6,907,321 | B2 | 6/2005 | Kearney et al. |
| 7,237,251 | B1* | 6/2007 | Oz et al. ............... 725/40 |
| 2002/0087973 | A1* | 7/2002 | Hamilton et al. ............... 725/32 |
| 2004/0098741 | A1 | 5/2004 | Hara |
| 2004/0244037 | A1 | 12/2004 | Yamaguchi et al. |
| 2004/0268400 | A1 | 12/2004 | Barde et al. |
| 2005/0078757 | A1* | 4/2005 | Nohrden ............... 375/240.28 |
| 2006/0190970 | A1 | 8/2006 | Hellman |
| 2007/0143799 | A1 | 6/2007 | Bloebaum |
| 2007/0211172 | A1 | 9/2007 | Kondo et al. |

FOREIGN PATENT DOCUMENTS

| | | |
|---|---|---|
| EP | 1657918 | 5/2006 |
| EP | 1936970 | 6/2008 |
| WO | WO2004/070688 | 8/2004 |
| WO | WO2004/080073 | 9/2004 |

OTHER PUBLICATIONS

"Telecommunications and Internet Converged Services and Protocols for Advanced Networking (TISPAN); IP Multimedia; Diameter Based Protocol for the Interfaces Between the Call Session Control Function and the User Profile Server Function/Subscription Locator Function; Signalling Flows and Protocol Details [3GPP TS 29.228 V6.8.0 and 3GPP TS 29.229 V6.6.0 modified]", ETSI TS 183 033 V2.0.0, Jun. 2008, pp. 1-8.

"Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 version 10.3.0 Release 10)" ETSI TS 129 228 V10.3.0, Oct. 2011, pp. 1-71.

"Digital Cellular Telecommunications System (Phase 2+); Universal Mobile Telecommunications System (UMTS); Cx and Dx Interfaces Based on the Diameter Protocol; Protocol details (3GPP TS 29.229 version 5.13.0 Release 5)", ETSI TS 129 229 V5.13.0, Oct. 2007, pp. 1-24.

"Digital Cellular Telecommunications System (Phase 2+); Universal Mobile Telecommunications System (UMTS); IP Multimedia Subsystem (IMS); Stage 2 (3GPP TS 23.228 version 6.16.0 Release 6)", ETSI TS 123 228 V6.16.0, Mar. 2007, pp. 181.

Digital Cellular Telecommunications System (Phase 2+); Universal Mobile Telecommunications System (UMTS); Signalling Flows for the IP Multimedia Call Control Based on Session Initiation Protocol (SIP) and Session Description Protocol (SDP); Stage 3 (3GPP TS 24.228 version 5.15.0 Release 5), pp. 1-714.

"Telecommunications and Internet Converged Services and Protocols for Advanced Networking (TISPAN); IP Multimedia Call Control Protocol Based on Session Initiation Protocol (SIP) and Session Description Protocol (SDP) Stage 3, [3GPP TS 24.229 [Release 7], modified]", ETSI ES 283 003 V2.6.1, Aug. 2008, pp. 1-12.

"Digital Cellular Telecommunications System (Phase 2+); Universal Mobile Telecommunications System (UMTS); Service Requirements for the Internet Protocol (IP) Multimedia Core Network Subsystem (IMS); Stage 1, (3GPP TS 22.228 version 10.4.1 Release 10)" ETSI TS 122 228 V10.4.1, Apr. 2011, pp. 1-35.

"Digital Cellular Telecommunications System (Phase 2+); Universal Mobile Telecommunications System (UMTS); LTE; IP Multimedia (IM) Session Handling; IM Call Model; Stage 2 (3GPP TS 23.218 version 9.2.0 Release 9)", ETSI TS 123 218 V9.2.0, Jun. 2010, pp. 1-67.

"Telecommunications and Internet Converged Services and Protocols for Advanced Networking (TISPAN); IPTV Architecture; IPTV Functions Supported by the IMS Subsystem", ETSI TS 182 027 V2.0.0., Feb. 2008, pp. 1-56.

"Telecommunications and Internet Converged Services and Protocols for Advanced Networking (TISPAN); IMS-Based IPTV Stage 3 Specification", ETSI TS 183 063 V2.4.2, Jun. 2009, pp. 1-130.

Rosenberg, J. et al., "An Invite-Intiated Dialog Event Package for the Session Initiation Protocol (SIP)", Network Working Group, Request for Comments 4235, Nov. 2005, pp. 1-37.

NIST/SEMATECH, "e-Handbook of Statistical Methods",http://www.itl.nist.gov/div898/handbook/, Jul. 18, 2006, Section 6.4 "Introduction to Time Series Analysis", 103 pages.

"Telecommunications and Internet Converged Services and Protocols for Advanced Networking (TISPAN); IPTV Architecture; IPTV Functions Supported by the IMS Subsystem", ETSI TS 182 027 V3.5.1., Mar. 2011, pp. 1-10 and pp. 128-133.

European Search Report, European Patent Application No. 09004876.0 dated Oct. 5, 2009.

PCT International Search Report and Written Opinion, PCT International Application No. PCT/EP2010/054433 dated May 7, 2010.

European Search Report, European Patent Application No. 10151839.7 dated Jun. 14, 2010.

* cited by examiner

PLAYING OUT INTERLUDES BASED ON PREDICTED DURATION OF CHANNEL-SWITCHING DELAY OR OF INVOKED PAUSE

"CROSS REFERENCE TO RELATED APPLICATIONS

The present application is a national stage entry of PCT/EP2010/054433, filed Apr. 1, 2010, and claims priority to EP 09004876.0, filed Apr. 2, 2009, and EP 10151839.7, filed Jan. 27, 2010. The full disclosures of EP 09004876.0, EP 10151839.7, and PCT/EP2010/054433 are incorporated herein by reference.

FIELD OF THE INVENTION

The invention relates to a method of controlling a play-out functionality of a data processing system; and to data processing equipment with a rendering functionality.

BACKGROUND ART

The content information in a digital television service is delivered as data packets from a server to an end user via a data network. The client at the end user processes the data packets and produces the audio and/or video to be rendered at the client for play out. Both the expressions "Internet Protocol TV" (IPTV) and "Internet Television" (iTV) refer to such digital television service that uses the Internet Protocol (IP). IPTV is typically supplied by a service provider using a closed network infrastructure (a so-called walled-garden network), whereas iTV uses the public Internet. The closed network of IPTV is a dedicated network, tailored to bandwidth efficient delivery of vast amounts of multicast video data. A digital television service typically offers a plurality of channels.

A problem with the digital television service encountered at the end user is the perceptible delay when changing channels (zap-time). The delay may be in the order of seconds, e.g., from 0.5 seconds to 5 seconds. This contrasts sharply with the zap-time in the order of a few tenths of a second, experienced when changing channels with analog television. The relatively long zap-time in a digital television service stems from the fact that, before being able to play out the content information of the new channel, the client is to perform following operations: switching to a new data stream in response to receiving a channel-switch command from the user; retrieving and parsing the metadata of the new data stream; and buffering, decoding and error-correcting the buffered data representing the content information. The zap-time may further also depend on which encoding scheme and which delivery protocol is being used. From the viewpoint of the end-user, shorter zap-times contribute to a higher perceived quality of the service.

A known approach to this problem is to shorten the zap-time by means of increasing performance in the technical domain, such as reducing buffering or pre-sending data streams. For some more background see, e.g., "Quality Issues in IP Delivery: Set Top Boxes", presentation for IBC 2008 by Nick Fielibert, Cisco Systems;

Another approach is to render and play out secondary content information to the user in the time between switching from one channel supplying primary content information and another channel supplying other primary content information. The zap-time then is not actually reduced, but the user receives a continual flow of content information, instead of experiencing disruptions as a result of an idle waiting time. See, e.g., U.S. Pat. Nos. 7,237,251; 5,786,845; 6,907,321; US patent application publication 20020087973; US patent application publication 20040098741; U.S. Pat. Nos. 7,237,251; 6,340,987; and US patent application publication 20070211172, all incorporated herein by reference.

US patent application publication 20020087973 discloses a method for inserting and displaying one or more signals during processing and display delays encountered in digital STB-receivers, including those delays encountered during channel changes.

U.S. Pat. No. 7,237,251 discloses methods and systems for displaying data to the viewer during zap time. The zap page is pre-rendered and stored within the STB. The zap page is displayed until the channel switch has been completed and then the target program is displayed in place of the zap page.

The problem of these prior art methods is that the zap page displayed during zap time has a fixed duration and might be too long or too short and will as a consequence not significantly enhance user experience.

EP0594350 discloses a solution for the problem that in a situation where interactive television is provided over a cable television system even with a large number of channels, it may not be possible to transmit a different program from the cable headend to each subscriber (column 1, lines 52-54). In one embodiment a method is disclosed in which the viewing of a program by multiple subscribers who begin viewing at different times is synchronized by using "filler" program segments having different lengths (column 3, lines 16-20). The selection of the filler is based on the time between the receipt of the additional request for the same program and the already predetermined next starting time of the program.

U.S. Pat. No. 6,473,137 discloses a method for perceptibly masking acquisition time after selection, by the user, of an alternative signal source (column 2, lines 13-15). The method is disclosed for a system with I-frame synchronization across all channels. This means that on all channels the next i-frame is present at exactly the same moment in time, so when the user selects another channel, the time until the next i-frame is fixed and can be calculated.

The problem of the last two prior art systems is that although the duration of the delay is taken into account the assumption of both systems is that the delay can be calculated or determined based on the fact that the starting time of the requested program or the channel change is predetermined. For systems where this is not the case e.g. because the delay depends on a number of factors, these solution will not result in optimal user experience.

SUMMARY OF THE INVENTION

The inventors have recognized that the scenario, of playing out secondary content information before the new primary content information is being played out, can be enhanced so as to further improve user experience. The inventors have further recognized that their approach is applicable not only to switching between digital TV channels, but also to, for example, conducting on-line transactions, switching between data processing contexts such as switching between a first software application and a second software application (local or remote to the first), etc. The inventors have also recognized that it would be advantageous to be able to predict the length of the delay, so as to tailor the secondary content information to the duration of the delay.

More specifically, the inventors propose a method of controlling a play-out functionality in a data processing system. The system provides to a user of the system access to a primary content information item, e.g., pre-stored or being generated as in a live broadcast. The system has a user interface for enabling a user to enter user input into the system. The system also has a primary module, coupled to the user interface and operative to process the user input in a predetermined manner for retrieving, under control of the user input, a primary data item representative of the primary content information item. The system also comprises a rendering device configured for receiving the primary data item and for rendering the primary content information item for being played out, e.g., via a display monitor or via a loudspeaker. The method comprises predicting a length of a delay between a first moment of the user entering the user input and a second moment suitable for beginning the play out of the primary content information item. The method further includes: selecting a specific one of multiple secondary content information items dependent on the predicted length of the delay, and controlling a rendering of the specific secondary content item at the rendering device for play-out of the specific secondary content information item during the delay.

Accordingly, when the user initiates the retrieval of the primary content information item by means of entering a user input, he/she has to wait before the playing out of the primary content information item starts. In the invention, the length of the delay is predicted, on the basis of which one or more secondary content items are rendered for being played out to the user during this delay.

The invention is partly based on the following insight gained from experiments.

Nowadays various digital television services are available that provide primary content information as data via a data network. However, the end-user of these services experiences longer delays than with the traditional analog TV while switching from one channel to another channel, i.e., while zapping. The user enters a specific user input into the system, e.g., a command via his/her remote control interacting with a set-top box, in order to switch channels and retrieve the primary data that representing the primary content information that is broadcast via the new channel. During zapping, the digital TV usually displays a black screen or a black screen with the channel number. However, it could be interesting for the TV viewer, if the screen displayed content information instead of just a black screen. This information may be an advertisement, information about the target channel, personalized content of the user, etc. The experiments referred to above resulted in quantifying the perceived Quality of Experience (QoE) of channel zapping.

Measuring the QoE of a digital TV service is an important issue for vendors and service providers. Channel zapping time is a major factor that affects perceived QoE in digital TV services. The experiments indicated that, for shorter zapping times, a black screen (i.e., the minimum amount of content information) was found to be preferred over displaying any larger amount of content information. For zapping times of intermediate duration, displaying a still-picture was found to be the more convenient approach. For longer zapping times, showing a video clip was preferred over a black screen or displaying a still picture. Therefore, results of the experiments suggest that the level of perceived QoE of zapping depends on both the length of the zapping time and the amount of information detail in the secondary content information shown during the channel switching. To improve perceived QoE of zapping, the experiments suggest that for an increase in zapping time, the preferred type of secondary content information rendered is preferably increased in complexity as perceived by the user, e.g., in the amount of information (bits) or in detail.

For example, a black screen is being used as secondary content information if the duration of the zapping time lies below a lower threshold, a video clip is being used as secondary content information if the duration of the zapping time lies above a higher threshold, and a still picture is being used as secondary content information if the duration lies between the lower and higher thresholds.

As another example, per range, the type of secondary content information is as specified above. However, each of the ranges, defined by above lower and higher thresholds, is sub-divided into sub-ranges. The number of different colors, the number of different objects, the level of detail, or the resolution level of the secondary content information to be displayed is made to depend on the sub-range that includes the predicted value of the duration of the zapping time. The dependence is such that the number of colors, the number of perceptible details, or the level of resolution increases for a longer duration of the zapping time. Note that semantically the same secondary content information, e.g., the same still picture or the same video clip can be displayed with different levels of resolution, or with different color palettes. Alternatively, semantically different secondary content information items, e.g., different still pictures and different video clips, having different levels of complexity as perceived by the user, can be rendered during different ranges of delays.

The term "resolution" as used herein refers to, e.g., the level of information or level of detail of the still picture, and to the level of information or level of detail of the images making up the clip.

For video-clips used as secondary content information in the range above the higher threshold, the resolution and/or dynamic behavior can be used as parameters, separately or in combination, whose values are chosen to increase with longer zapping times.

The expression "dynamic behavior" is used in this text as opposed to "being static", and refers to a level of changes over time or level of activity in the clip being played out. A higher resolution of the images in the video clip and/or a higher level of dynamic behavior and/or a larger color palette all represent larger amounts of information presented to the user.

Accordingly, the semantic content of one or more secondary content information items, as played out during the delay, is made effective by means of more or less matching the amount of semantic content, as conveyed during the delay, to the length of the delay.

In an embodiment of the method, the selecting also depends on at least one of: an identity of the user; a semantic content of the primary content information item; a geographic location of the rendering device; a geographic location of a primary resource of the primary content information item; and a time of the day at the geographic location. This enables to select the semantic character of the specific secondary content information item so as to be tailored to the individual user.

Although the invention has been introduced above with reference to a digital TV service, other services may benefit from the invention as well, such as on-line ordering or booking services, as will de discussed below.

The invention further relates to data processing equipment that has a user interface for enabling a user to enter user input into the equipment. The equipment also has a network interface to a data network configured for receiving, via the data network and in response to the user input, a primary data item representative of a primary content information item. The equipment further comprises a rendering device configured for receiving the primary data item from the network interface and for rendering the primary content information item in order to be played out. The equipment also includes a secondary module that comprises a delay predictor and a selector. The delay predictor is operative to predict a length of a delay between a first moment of the user's entering the user input and a second moment suitable for beginning the play-out of the primary content information item. The selector is configured for selecting a specific one of multiple secondary content information items dependent on the predicted length of the delay. The secondary module is operative to control a rendering of the specific secondary content information item at the rendering for the play out of the specific secondary content information item device during the delay.

An example of such data processing equipment in the invention is a digital TV receiver. The user enters user input to switch channels. As explained above, there will be a delay before the user can watch the primary content information on the new channel. The receiver has a resource, e.g., a storage, or is connected to a resource, that stores a plurality of secondary content information items. The secondary content items may have been prepared and stored by the user him/herself, or they may have been prepared and supplied by another party. For example, the secondary content items have been stored in advance at the digital TV receiver by the same service provider that supplies an electronic program guide (EPG). An advantage of this business model is that the secondary content items can have been prepared in advance as semantically associated with the primary content information items available on the broadcast channels according to the EPG. It is known in advance what program is when being broadcast on what channel. Therefore, the moment, at which the user initiates the switching to a particular channel, together with the identity of the particular channel, determine the program that the user will actually be watching. The selector could therefore use the actual moment of receipt of the user input and the identity of the particular channel, in addition to the predicted length of the delay, in order to select a secondary content item, the rendering and play-out of which matches the predicted delay and the semantic content whereof matches the program. For example, the secondary content information item played out during the delay, before the user starts watching the film being broadcast on the particular channel, is a picture of a theater poster of that film.

In an embodiment of the equipment, a resource is connected to the selector and is configured for storing the multiple secondary data items.

In a further embodiment, the equipment comprises a digital television with a network interface for receiving, via a data network, the primary content information item in a broadcast on a channel of a digital TV service.

BRIEF DESCRIPTION OF THE DRAWING

The invention is explained in further detail, by way of example and with reference to the accompanying drawing, wherein.

Throughout the Figures, similar or corresponding features are indicated by same reference numerals.

DETAILED EMBODIMENTS

Generic Concept

Figure 1:
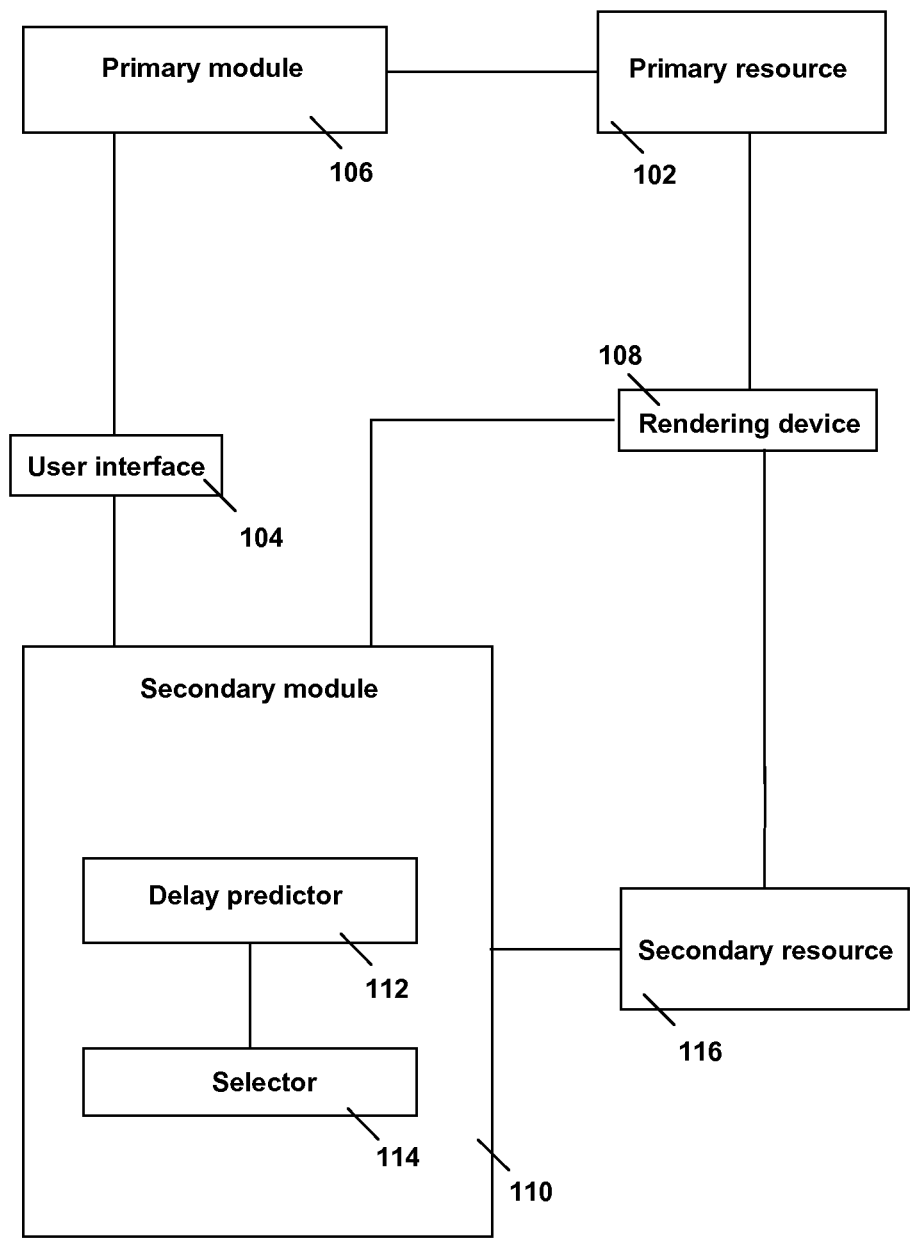
FIG. 1 is a block diagram of a generic system in the invention.

FIG. 1 is a block diagram for illustrating the functionalities of a generic data processing system 100 in the invention. System 100 provides, to an end-user, access to a plurality of primary data items, e.g., computer files, representative of a plurality of primary content information items when displayed or otherwise made user-perceptible. Within this context, a primary content formation item is, e.g., a program on a channel of a digital TV service or of a digital audio service, a web page, a software application program, etc. The primary data items are supplied from a primary resource 102. The primary data items have been prepared in advance and have been stored, or they are generated in real-time as in a live broadcast.

System 100 has a user interface 104 for enabling a user to enter user input into system 100. System further comprises a primary module 106 that is coupled between user interface 104 and primary resource 102. Primary module 106 is operative to process the user input in a predetermined manner for selecting a particular one of the primary data items in primary resource 102 under control of the user input. For example, the user input is interpreted as a request for a particular primary content information item, represented by the associated primary data item. System 100 also has a rendering device 108. Rendering device 108 is configured for receiving the selected particular primary data item from primary resource 102 (directly or indirectly via a data connection or data network). The particular primary data item as selected is representative of a particular one of the primary content information items made available from primary resource 102. Rendering device 108 is operative to decode the particular primary data item and render the associated particular primary content information item for play-out to the user. Typically, there will be an appreciable delay between the entering of the user input and the start of the rendering or play-out operation. An appreciable delay will affect the quality of the system's service or of the system's operation as perceived by the user.

So far, the functionalities of system 100 as provided by components 102, 104, 106 and 108 are known in the art in a variety of implementations, discussed in more detail below. The inventors now propose the following to improve the perceived quality of the service or of the operation of system 100.

System 100 comprises a secondary module 110 coupled, directly or indirectly, to user interface 104 and to rendering device 108. Secondary module 110 includes a delay predictor 112 that is operative to predict or estimate a length of a future time delay between a first moment, at which the user enters the user input via user interface 104, and a second moment, at which rendering device 108 is ready to begin rendering the particular primary content information item selected in response to the user input. Secondary module 110 also comprises a selector 114 that is operative to select a particular one of a plurality of secondary data items available from a secondary resource 116. The selection by selector 114 is made under control of the length of the predicted delay determined by predictor 112. Respective ones of the secondary data items are representative of respective ones of secondary content information items. Upon selection of the particular secondary data item, secondary module 110 causes the particular secondary content information item, associated with the selected secondary data item, to be rendered at rendering device 108 for play-out during the predicted delay, so as to bridge the gap between the user input and the eventual start of the playing out of the primary content information item.

As mentioned above, the predicted length of the delay controls operation of selector 114. The predicted length is then used as an entry that selector 114 converts to an address, address range or another parameter or parameter range for selection of an item of secondary content information available from secondary resource 116. Note that in addition to the attribute "predicted length", one or more other attributes can be used in addition for selecting the item, for example, the identity of the user having entered the user input, the time of the day at the geographic location of the user, the geographic location of the user, etc. For this purpose, the secondary content information items can be stored in, e.g., a relational database. Preferably, multiple ones of the secondary content information items form a match with the entry to selector 114. The user can then be supplied long enough with different secondary content information items before they are repeated.

Delay predictor 112 is operative to predict a delay between the moment of the entering of a command via user interface 104 and the moment at which the user is given access to the particular primary content information item.

In an embodiment of predictor 112, its operation is based on a parameterized algorithm. Domain-specific knowledge is obtained in advance and is programmed or otherwise built into predictor 112. For example, the (approximate) length of the delay involved in a specific usage scenario is known in advance. The specific usage scenario depends on, e.g., the request being issued, at a certain time of the day, from user interface 104 in a certain geographic region and for a certain primary content information item. This domain-specific knowledge is then formatted in a look-up table accommodated in, or accessible to predictor 112.

In another embodiment of predictor 112, its operation is based on Predictive Analytics. Predictive Analytics encompasses a variety of techniques, from statistics to data mining, that analyze current and historical data in order to make predictions about future events. An example of such a technique relates to a time series model. First a history log is built from which a historical time series can be created. A historical time series is an ordered series of data that represent the delays experienced in the past when switching to the second particular channel or when switching from the first particular channel to the second particular channel. The historical time series then provides the basis for predicting or estimating the length of the delay experienced in the future, using a Moving Average model, known in the art. Examples of Moving Average models are referred to in the art by the names of: simple moving average model, weighted moving average model, cumulative moving average model, and exponential moving average model. For more background, see, e.g., Box, George; Jenkins, Gwilym (1976), "Time series analysis: forecasting and control", rev. ed., Oakland, Calif.: Holden-Day; or NIST/SEMATECH, "e-Handbook of Statistical Methods", http://www.itl.nist.gov/div898/handbook/, Jul. 18, 2006, Section 6.4. "Introduction to Time Series Analysis". This and other examples of techniques used in Predictive Analytics are well known in the art, and will not be discussed here.

In an embodiment of system 100, selector 114 not only selects the secondary data item in dependence on the length of the delay predicted by predictor 112, but also in dependence on one or more other criterions. Examples of such other criterions are the identity of the party entering the user input into user interface 104, and/or the identity of the party eventually being presented with the rendered primary content information item at a play-out device (not shown) via rendering device 108. This approach enables to personalize the secondary content information items presented during the delay. Note that the parties can, but need not, be one and the same person.

Another example of such criterion is the semantic type or the semantic content of the primary content information item supplied to rendering device 108 after the delay and in response to the user input. To illustrate this approach, the user input is given through a graphical user interface 104 presenting user-understandable representations of options in a menu, e.g., icons or images or text. The user input is a request for access to a particular piece of primary content information of a particular type known in advance: e.g., a movie, a live broadcast of a sports event presented in an electronic program guide (EPG), a news broadcast, a multiplayer video game played on the Internet, a piece of music, a website, a software application to be loaded, etc. The secondary content information has then a semantic content, when being played out, that is tailored to the semantic content of the primary content information requested via user interface 104. This then gives the impression of a seamless transition as if the selected secondary content information item forms an integral, or at least a plausible, part of the primary content information item. For example, the primary content information is a movie. The secondary content information item, selected for being played out before the start of the playing out of the movie, is a still picture or video clip showing the familiar theater curtains, or is a still picture of the movie poster, a picture of the lead actress, a brief video clip of a characterizing scene, an advertisement, etc. In case of the live broadcast of the sports event, the secondary content information item is, e.g., an iconic still picture characterizing the sport, a video clip of the relevant arena, circuit, stadium, etc., a still picture or video clip of a flag with club colors, an advertisement, etc. If the primary content information item is a news broadcast, the secondary content information item is a still picture or video clip of the logo of the news agency, or of an event considered the most relevant one on this day, etc.

Yet another criterion for determining the secondary content information item to be rendered is the time of the day, the day of the week, the geographic location of rendering device 108, etc. This approach can be used to even better tailor the semantic content of the selected secondary content information item to the targeted audience determined on the basis of the semantic content of the primary content information item that is going to be rendered at rendering device 108.

Different techniques can be applied to give the user the impression of seamless transitions between the playing out of a primary content information item and the playing out of a selected secondary content information item. Rendering device 108 may be configured to use an overlay layer for rendering the secondary content information item on a display monitor of rendering device 108, a fading in/out technology, or a window for playing out the secondary content information item that grows smaller when the rendering of the primary content information item starts for being displayed in a window that grows larger, etc.

Some, or all, of the functionalities schematically shown in the diagram of FIG. 1 can be implemented by software running on a dedicated or special-purpose computer, or by hardware, or by a combination thereof. The functionalities in the block diagram of FIG. 1 have been represented as separate components, and the connections or couplings between the components have not been specified above in detail. Some of them could be integrated with one another within a single software or hardware component. The components of system 100 can be accommodated at one single location, i.e., the end-user's equipment, or can be distributed among several geographic locations in order to enable a variety of business models.

In order to illustrate the above, consider the following usage scenarios in different implementations of system 100.

Channel Zapping Scenario

Figure 2:
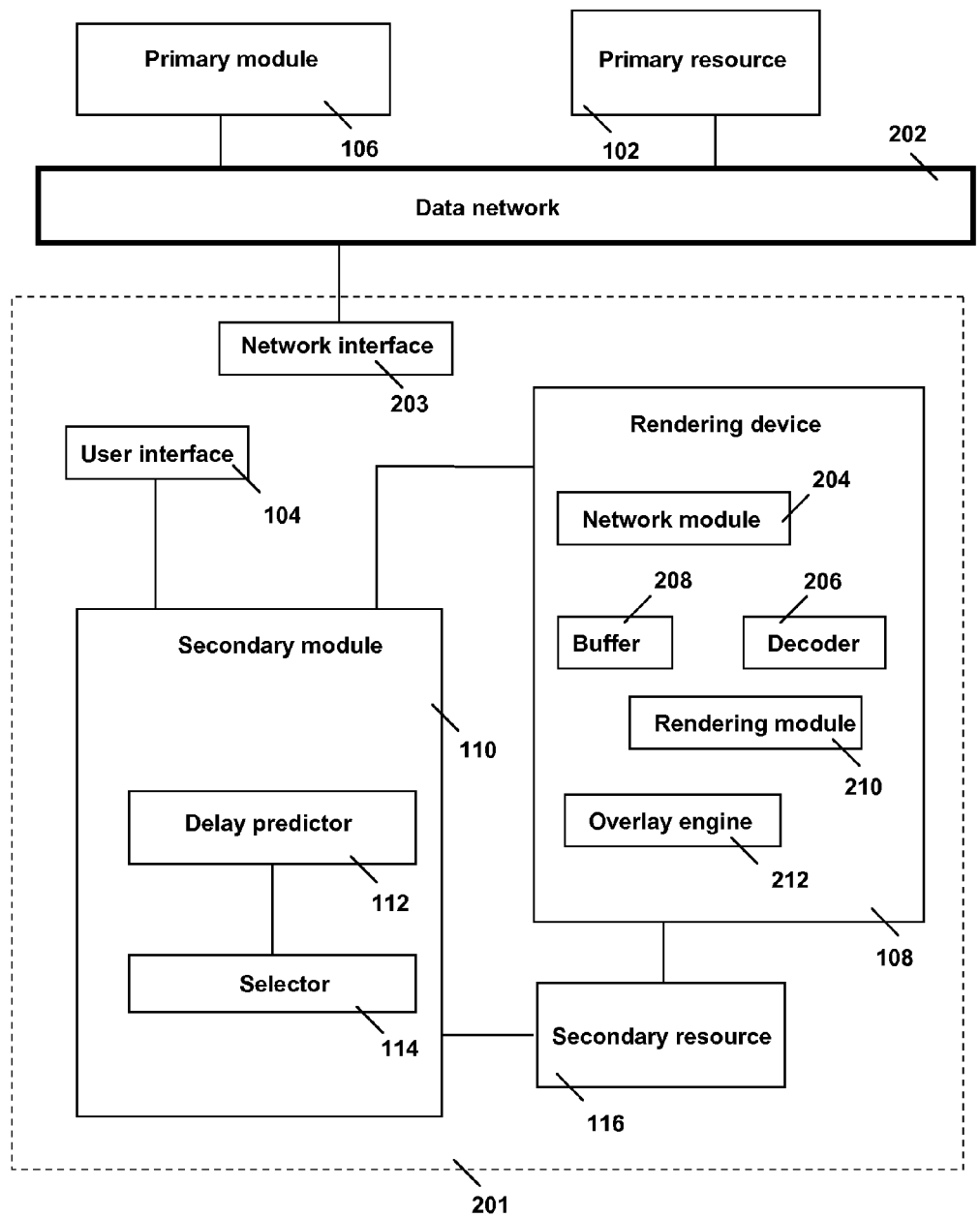
FIGS. 2, 3, 4 and 5 illustrate various implementations of a system in the invention.

FIG. 2 illustrates an implementation 200 of system 100 in a scenario that relates to a digital TV service or a digital radio service. The service enables a user to receive at his/her home equipment 201, via a data network 202, a data item representative of primary content information in a broadcast or multicast on a digital TV channel or a digital radio channel. Equipment 201 has a network interface 203 for this purpose. Consider the example of rendering device 108 comprising a display monitor coupled to an IPTV set-top box (STB). An IPTV STB typically includes the following components for receiving and decoding an IPTV stream: a network module 204, a decoder 206, a buffer 208, a rendering module 210, and an overlay engine 212. Network module 204 is configured for sending and receiving data packets over a connection to the Internet 202 or another data network. Decoder 206 decodes the encoded audio or video stream received via network module 204 to a sequence of video frames or audio frames, respectively. Buffer 208 provides temporary storage for the data packets received by network module 204. The unit of data on which decoder 206 operates, e.g., a video frame, typically comprises a plurality of data packets that all need to be simultaneously available to decoder 206 before the decoding of the data unit can actually start. Buffer 208 collects enough data packets so that decoder 206 can start operating. Furthermore, buffer 208 prevents decoder 206 from starving due to variations in the arrival time of consecutive data packets at the IPTV STB. Rendering module 210 comprises a display monitor for displaying a video frame and/or a loudspeaker for generating sound. Rendering module 210 may also combine frames from different decoder instances so as to provide split screen video, picture-in-picture, of transition effects from one channel to another. Overlay engine 212 renders ancillary content information that is overlaid over the video frame when displayed by module 210. The ancillary content information comprises, for instance, a text message such as "now showing channel A", an image, another video feed, or an Electronic Program Guide.

In practice multiple instances of buffer 208, decoder 206 and rendering module 210 may be used for the parallel processing of audio and video signals. Additional components may be available in the rendering device 108, such as a de-multiplexer (not shown) for the de-multiplexing of audio and video signals.

As mentioned above, the length of a time period indicative of the delay can be measured in a variety of manners. In order to explain these, consider the following. The content information supplied via an IPTV channel is transmitted as IP data packets. The data packets have a source address and a destination address. Transport layer protocols, such as TCP (Transmission Control Protocol), UDP (User Datagram Protocol) and RTP (Real-Time Transport Protocol), provide port numbers as additional addressing identifiers. RTP data packets contain session identifiers such as the Synchronization Source identifier (SSRC) that uniquely identifies the source of a data stream or the Contributing Source identifiers (CSRC) that enumerate contributing sources to a data stream generated from multiple sources.

The delay can be determined with the use of events occurring at network module 204. The source addresses and destination addresses are used to route packets via the Internet or other data network, to their destinations. However, the source addresses and/or destination addresses can also be used to detect a channel switch. For example, the primary data of the primary content information on a channel A is transmitted to a destination address 225.0.0.1, whereas the primary data of the primary content on a channel B is transmitted to a destination address 225.0.0.2. During the switching from channel A to channel B, the network module is receiving data packets with destination address 225.0.0.1, but eventually will receive data packets with destination address 225.0.0.2. The reception of the first data packet from channel B can be detected based on the new IP address and can be used as a trigger for sending a message from network module 204 to secondary module 110. The message signifies to module 110 that the channel switch has been completed. Module 110 can then determine moment of the completion of the channel switch. The time period between, on the one hand, the user's issuing a command via user interface 104 in order to change channels and, on the other hand, the receipt of the first data packet of the new primary content information, is then measured and can be used in the prediction of the delay in switching from any channel to channel B, or from channel A to channel B.

Similarly, the additional addressing identifiers of the transport protocols TCP, UDP and RTP can be used to determine the moment at which the primary content information from the new channel has arrived. For example, the primary data for an IPTV channel C is transmitted from IP address 192.168.0.1, port number 2000; whereas the primary data for an IPTV channel D is transmitted from IP address 192.168.0.1, port number 3000. During the switching from channel C to channel D, network module 204 is initially receiving data packets with source address 192.168.0.1, port number 2000, but eventually module 204 will be receiving data packets with source address 192.168.9.1, port number 3000. The reception of the first data packet from channel C can be determined on the basis of the source address and port number. This event then can be used as a trigger for sending a message from network module 204 to secondary module 110 for signifying to module 110 that the channel switch has been completed. Module 110 thereupon determines the length of the delay of the channel switching operation. Alternatively, the destination port numbers can be used to determine the moment at which the beginning of the new primary content information item has arrived. For example, TV channel A is received at network interface 203 at port number 8000, and TV channel B is received at network interface 203 port number 9000. It can be detected when the data of the new primary data item starts arriving at the channel to which the user has newly tuned equipment 201. This then determines the moment at which the associated primary content information can start to be rendered.

Likewise, different port numbers serving as additional addressing identifiers in a transport layer protocol, e.g., TCP, UDP or RTP, can be used to distinguish between different IPTV sessions. A delay involved in a channel switch is determined on the basis of the difference in time between the user issuing a command via user interface 104, and the first receipt of the new additional addressing identifier in the transport layer protocol. Network module 204 signals to secondary module 110 that the new additional addressing identifier has been received for the first time, and module 110 thereupon determines the length of the delay.

Furthermore, a change in the Synchronization Source (SSRC) or Contributing Source in RTP data packets signals a transition from one session to another session. The occurrence of the new SSRC or CSRC then can be used as a trigger for sending a message from network module 204 to secondary module 110 for signifying to module 110 that the channel switch has been completed. Module 110 thereupon determines the length of the delay of the channel switching operation.

The delay can also be measured with the use of events occurring at buffer 208. Consider that, upon a command for a channel switch, the data corresponding to the new IPTV channel is placed in buffer 208 upon receipt via network module 204. However, buffer 208 may initially still contain data from the previous IPTV stream. There are several options available to deal with the old IPTV data and the new IPTV data in buffer 208.

As a first option, the STB flushes buffer 208 so that all data from the previous session is removed. As second option, the STB waits for decoder 206 to empty buffer 208 before filling buffer 208 with the data of the new IPTV channel. It can be checked with a polling mechanism when buffer 208 has been emptied. The poling mechanism then sends a notification to secondary module 110, notifying the latter that the channel switch has occurred. The STB starts filling buffer 208 with the new data. A third option is that the STB creates a new instance of buffer 208 for the new IPTV channel.

The events characterizing these options can be considered indicative of the end of the channel switch waiting time and can therefore be used at delay predictor 112 for future predictions.

Note that the packet payload may contain multiplexed data, such as an MPEG Transport Stream (TS). The Transport Stream (TS) contains metadata for the elementary streams contained in the transport stream. This metadata can be used to detect a new IPTV session and therefore to trigger notifying module 110 of the end of the channel switch time.

In addition, the delay can be measured on the basis of events occurring at decoder 206. Namely, before decoder 206 can decode the new IPTV data stream, decoder 206 needs to be reinitialized to enable the decoding of the encoded frames. The moment this initialization occurs triggers the sending of a notification to module 110 that the channel switching time has elapsed.

Furthermore, events at overlay engine 212 can be used to notify the user of the end of the channel switch, for instance, by displaying the new channel number and/or title of the current program on that channel. This displaying can be detected and used to trigger sending a notification to module 110, where delay predictor 112 uses the temporal information for future predictions.

Once delay predictor 112 can predict the length of the delay involved in the switching from a channel X to a channel Y, selector 114 can use this prediction to select a convenient secondary content item from secondary resource 116 and have it rendered at rendering device 108. For example, a black screen is being used as the secondary content information item if the duration of the delay lies below a lower threshold, e.g., about half a second. In practice, this means that selector 114 does not have to select anything from resource 116. A video clip is being selected as the secondary content information if the duration of the switching time lies above a higher threshold, e.g., about 2.5 seconds. A still picture is being selected as the secondary content information item if the duration lies between the lower and higher thresholds. This example describes a discrete scale, wherein different types of secondary content information items are allocated to different time intervals. As an alternative, one could use a floating scale by allocating secondary content information items of gradually increased complexity (gradually more detail, or gradually higher resolution, or gradually more information in terms of bits) to a gradually increased time interval.

Digital Video Broadcasting (DVB) is a suite of open standards for digital TV. In digital TV over DVB-T (DVB terrestrial), multiple TV channels are broadcast in a particular frequency band. The receiver then tunes in on this frequency band, and receives the broadcasts on all the channels in that frequency band simultaneously. The data that represent a single broadcast (audio, video) is interspersed with the data of all other broadcasts in that frequency band. In digital mobile TV over DVB-H (DVB handheld), digital TV is received at a mobile, handheld receiver. In order to extend the time period of operational use of the receiver until the receiver's battery is to be re-charged, the data of different channels is broadcast in different time-slots. The time-slots are cyclically recurring. A single cycle is made up of a sequence of consecutive time slots, wherein different time slots have been assigned to different channels. This approach is referred to as "time-slicing". A mobile receiver for receiving a broadcast in a digital TV channel over DVB-H is configured to turn on in time to receive the relevant data in the time slot associated with the channel, and to turn off after the time slot has elapsed.

A drawback of time-slicing is that when the user switches the receiver to another channel, the receiver has to intercept the relevant data in another time slot. This requires a time span of say, 4 seconds.

An option is then to configure the receiver to be turned on during multiple consecutive time slots. For example, the receiver is active during three consecutive time slots: the one allocated to the channel that the receiver has been tuned in to, and the two adjacent time slots. This configuration enables fast channel-up and channel-down processes. If the user repeatedly enters the channel-up commands or the channel down commands fast enough, the receiver has to repeatedly tune again to the intended channel and settle. This will be perceived by the user as a delay. Similarly, if the user switches to a channel that has a time slot at the other end of the cycle, there will be an appreciable delay before the rendering of the broadcast program on the intended channel actually starts.

The invention can be applied to such a mobile digital TV receiver as follows. When the user enters the command "channel-up" or "channel-down" if the receiver has been tuned to a certain channel, the display monitor is controlled to show a black screen. If the user repeatedly enters the "channel-up" command or "channel-down" command within a time period too short for the receiver to settle, or if the user switches to a channel whose upcoming time slot is far removed from the time slot of the current channel, the receiver is configured to render secondary content information such as an image or a video.

In FIG. 2, primary module 106 is shown as coupled to home equipment 201 via data network 202. Consider the example of the user entering user input into system 200 via user interface 104 in order to request playing out, via rendering device 108, of a certain movie provided by primary resource 102. Primary module 106 then translates this request into an identifier of a certain TV channel, i.e., the channel's network address, via which this movie is being supplied. An advantage of such an approach is that the user does not need to know the identifier of the channel. The channel may be used by a video-on-demand service, and its identifier is irrelevant to the user.

Alternatively, primary module 106 is accommodated at home equipment 201 itself Primary module 106 is then programmed for converting the user input to the proper channel, i.e., network address.

Context Switch Scenario

Figure 3:
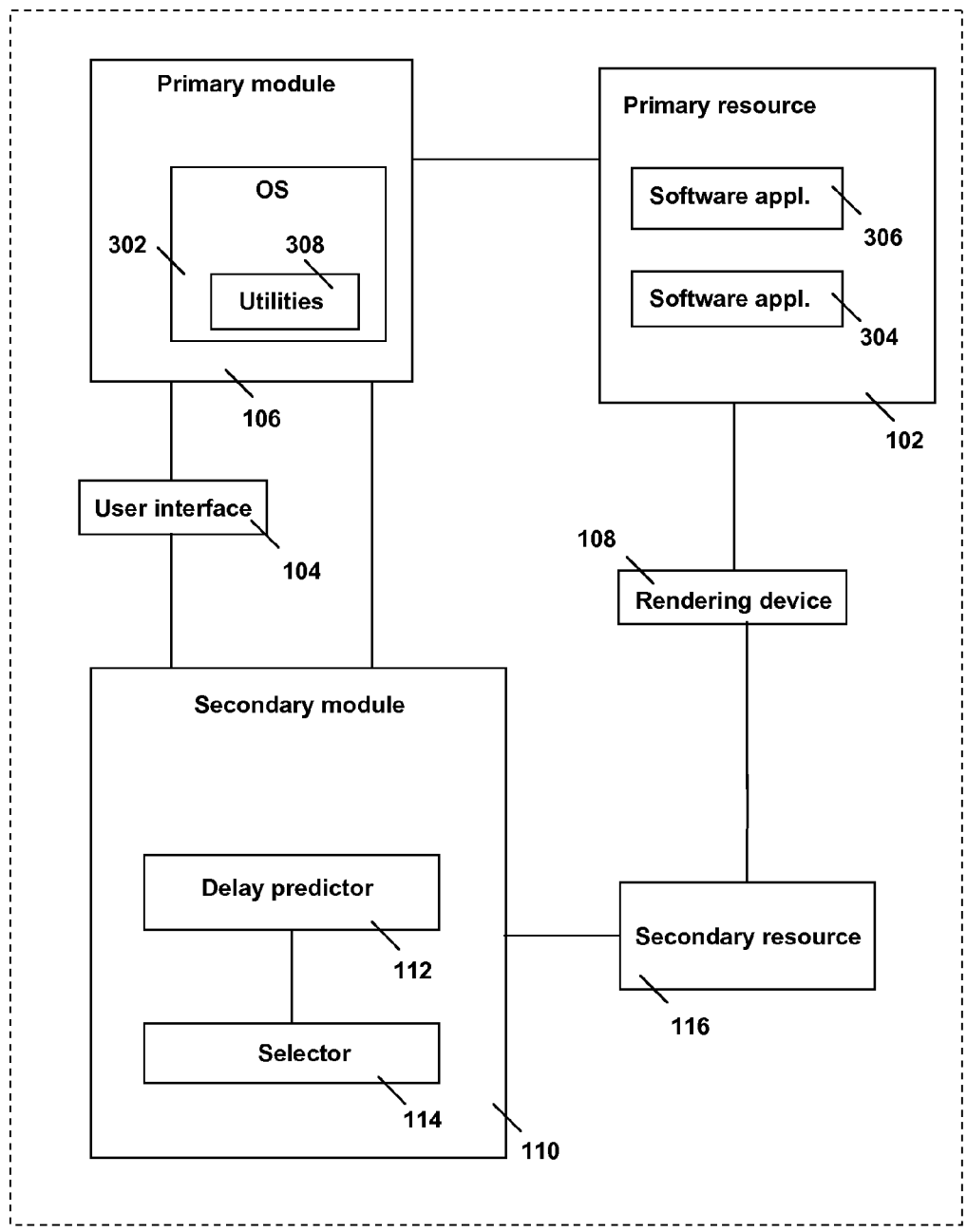

FIG. 3 illustrates an implementation of system 100 in a scenario that relates to a user switching contexts when interacting with a data processing system 300, e.g., a stand-alone computer or a client-server system, via user interface 104. The concept "context switch" as used herein refers to the switching from a first data processing task to a second data processing task, typically in response to the user entering a corresponding command via user interface 104. Upon receipt of the user command an operating system (OS) 302 controls the switching from the first to the second task, e.g., by means of loading the software application associated with the second task. The context switch enables the second task to use the system resources previously claimed by the first task.

For example, the user switches from a first software application 304, active on his/her display monitor, to a second software application 306, e.g., from "Word" to "PowerPoint". Applications 304 and 306 form different instances of primary content information as perceived by the user. A function of OS 302 is to allocate system resources to software applications. Examples of system resources are: CPU processing time; memory; access to the screen of rendering device 108; etc. OS 302 also provides scheduling mechanisms to allow multiple software applications, which have been loaded by OS 302, to access the same system resources.

The user selects the "PowerPoint" software application via user interface 104, e.g., by means of manipulating a computer mouse for guiding a cursor on the display screen of rendering device 108 to the relevant icon displayed, and clicking the mouse when the cursor has been positioned over the icon. The selection via user interface 104 causes OS 302 to load the "PowerPoint"" software application, and to allocate the system resources to the "PowerPoint" software application. Once the "PowerPoint" software application is loaded and the system resources are allocated, the user can start interacting with the "PowerPoint" software application via user interface 104 and the display monitor of rendering device 108.

Utilities, tools or service programs 308 are available in a typical computer system and help manage the computer hardware and the application software. Typically, these utilities, tools or service programs 308 have been integrated in the computer's OS 302.

An example of utility software is Process Explorer, a freeware computer program for Microsoft Windows. Process Explorer is a system monitoring and examination utility. Process Explorer provides features that enable its user to track down problems. For example, it provides a means to list or search for named resources that are held by a process or all processes. This can be used to track down what is holding a file open and preventing its use by another program.

Accordingly, the conventional utilities 308 provide a means to generate a signal when a process begins holding a system resource, e.g., the screen of the display monitor. The occurrence of this signal, together with the occurrence of the preceding user command for starting the new software application can be used to determine a time period indicative of the delay experienced by the user in the context switch. These occurrences are signaled to module 110, where delay predictor 112 uses the temporal information for future predictions on the basis of which the secondary content items are selected for being rendered during the delay. Feasible instances of secondary content information items have been mentioned in the discussion of system 100 in FIG. 1.

Note that the above has been illustrated with a stand-alone computer, but is equally feasible in a client-server architecture wherein the client and server communicate via a data network.

On-Line Ordering or Booking Scenario

Figure 4:
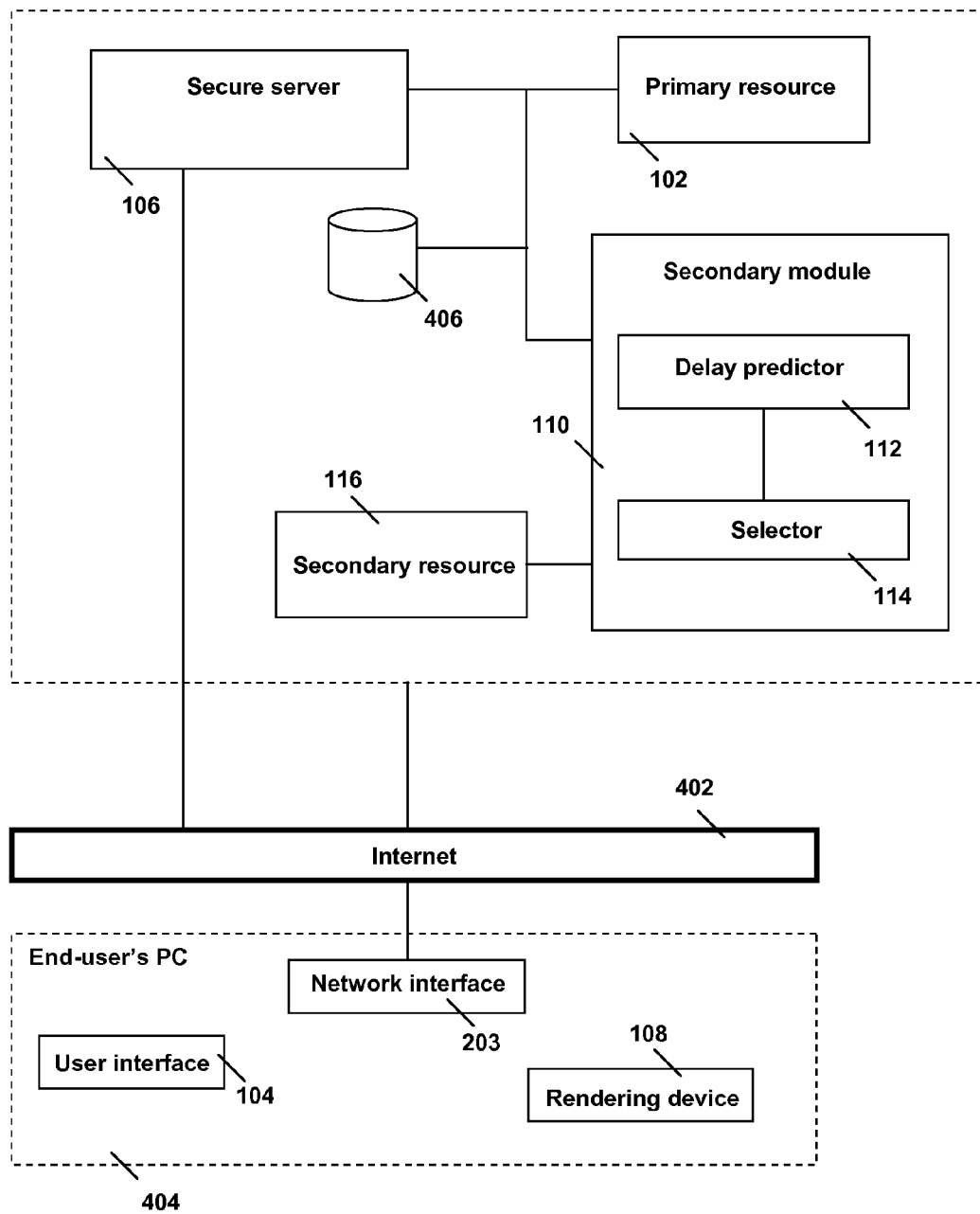

FIG. 4 illustrates an implementation 400 of system 100 in a scenario that relates to transactions such as ordering a product or service on-line, i.e., via the Internet; booking a hotel or an airline ticket on-line; checking in via the Internet for a scheduled flight from home, or conducting a financial transaction via on-line banking.

Typically, the user then interacts via the Internet 402 with primary resource 106 being a secure server 106, using the browser of his/her PC 404. The interaction leads the user through a dialog with secure server 106 via a menu with options displayed at the display monitor of rendering device 108. If the user selects a particular option at a certain stage in the interaction through user interface 104, he/she receives one or more primary content information items in the form of an interactive web page or a frame with an interactive HTML document. Each such primary content information item represents a different step in the dialog between the user and sever 106 before the transaction is completed. One or more databases 406 of account numbers, credit card numbers, personal identification numbers (PINs), accounts, and other relevant data need to be verified at one or more servers during the interaction of the user with the secure website. All this may cause additional delays on top of the ones mentioned under the browsing scenario in the previous example.

In implementation 400 of the system of the invention, the operator of secure server 106 controls secondary module 110 and secondary resource 116. During the time period that the user has to wait before receiving a response to the user input, entered via user interface 104 and supplied to secure server 106 via the Internet 402, server 106 instructs secondary module 110 to select an appropriate secondary content information item for being played out to the user in the meantime via rendering device 108. The secondary content information item is selected on the basis of the expected delay. Additional criterions may be applied to select the appropriate secondary content information item, e.g., the identity of the user of PC 404, the semantic content of the transaction, the semantic content of the relevant step in the dialog, the geographic location of PC 404, etc. Thus, the selected secondary content information item not only masks the delay, but is also perceived as a personalized service tailored to the specific user of PC 404 at that moment, and as an integral part of the semantic context of the actual transaction.

Figure 5:
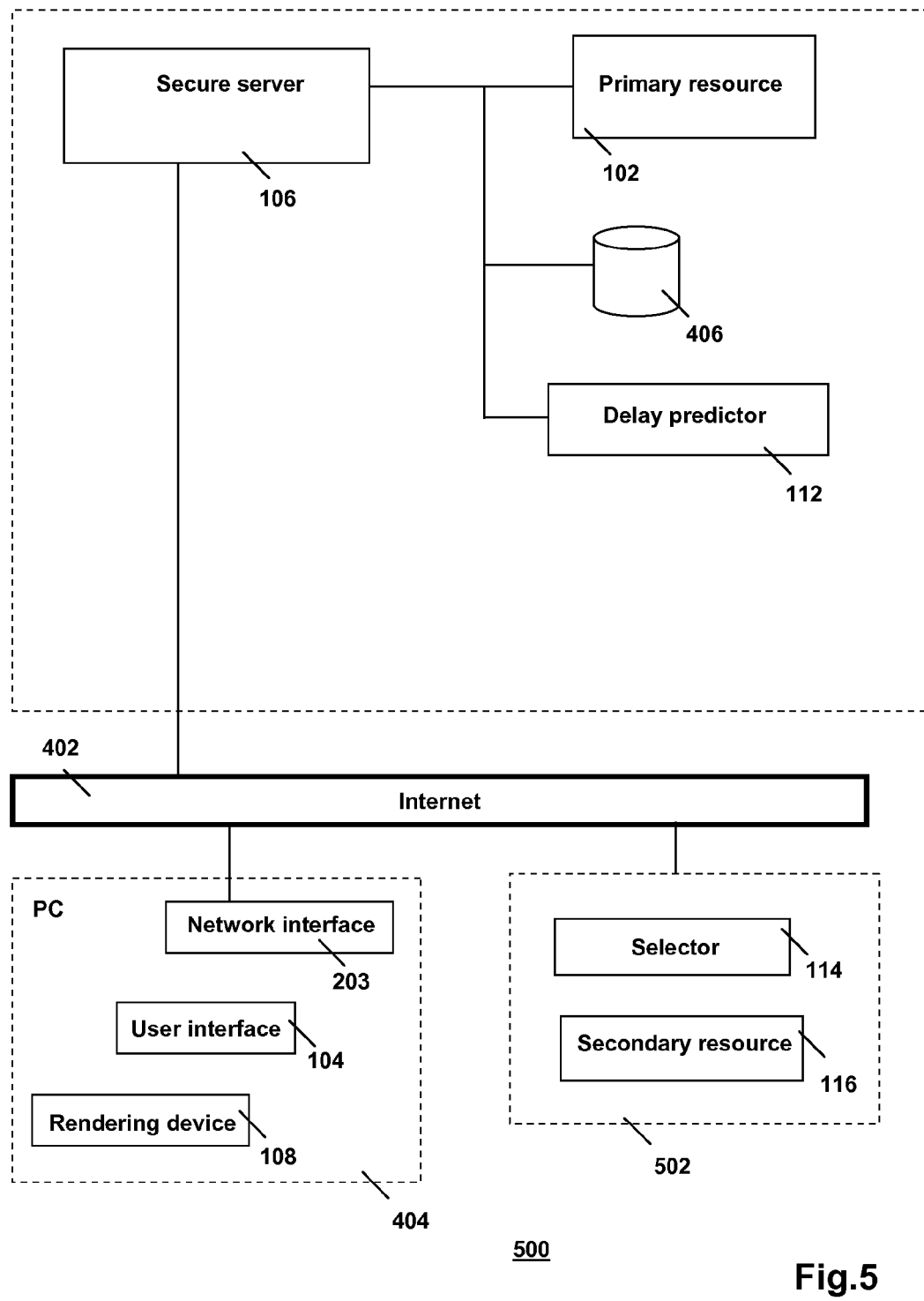

FIG. 5 is a diagram that illustrates an alternative implementation 500 of system 100 for use in the on-line transaction scenario. In implementation 500, the party operating secure server 106 and primary resource 102 delegates the selection of the secondary content information item to another party 502 via the Internet 402. Party 502 receives information about the predicted delay from, e.g., server 106. Based on this and, optionally, other information, party 502 selects the specific secondary content information item and forwards that as data to server 106 that thereupon supplies the data to PC 404.

Pausing Scenario in IMS-Based IPTV Network

In yet another embodiment, the data processing system is implemented in an IP Multimedia Subsystem (IMS)-based IPTV network. The IMS architecture is a unified architecture that supports a wide range of services enabled by the flexibility of the Session Initiation Protocol (SIP). IMS is defined by certain 3GPP and 3GPP2 standards (such as 3GPP TS 22.228, TS 23.218, TS 23.228, TS 24.228, TS 24.229, TS 29.228, TS 29.229, TS 29.328 and TS 23.320 Releases 5-7). An IMS-based IPTV network, for example as defined by ETSI TIS-PAN in TS 182 027 and TS 183 063, comprises an IMS core connected to a Service Control Function (SCF). The SCF is a network functionality configured for managing one or more sessions between the IMS-based IPTV network and the end-user equipment. The end-user equipment comprises a device that is used by the end-user to consume IPTV content information and/or to use one or more communication services provided via the IMS-based IPTV network. In such an IMS-based IPTV environment, media delivery is taking place between the end-user equipment and a Media Delivery Function (MDF) using the Real Time Transport (RTP) protocol. The media delivery takes place, once a session has been established, under control of SIP, between the SCF and the end-user equipment. A Media Control Function (MCF) provides control over the media stream, for example, to perform trick play commands, using the Real Time Streaming Protocol (RTSP).

Consider an IMS network that provides an IPTV service to the end-user. In such a scenario, the delivery of the primary content information items and secondary content information items is managed by the MDF and MCF. The SCF manages the IMS sessions. The end-user equipment is used to render and present the primary content information items and secondary content information items to the end-user. The end-user equipment could be implemented in, for instance, an IPTV STB. In IMS terminology, broadcast television is referred to as BC, and an on-demand session is referred to as CoD.

The set-up of an IMS session for IPTV services is described in Release 2 of the ETSI TISPAN IMS-based IPTV Stage 3 specification (TS 183 063). In this environment, the play-out of the primary content information item is realized by, for example, initiating a multimedia session by the UE or by the SCF using SIP, e.g. using the SIP INVITE-message comprising the session identifier of the primary content information item.

The current IMS specification, however, does not address the insertion of one or more secondary content information items when an ongoing session of the primary content information is paused.

An embodiment of the invention addresses this issue and provides a solution regarding how to implement a procedure for inserting one or more secondary content information items when an ongoing session of the primary content information is temporarily suspended. This is explained as follows.

Consider an ongoing BC session or an ongoing CoD session in an IMS network. The ongoing session can be temporally interrupted in order to create a pause. For example, the end-user interrupts the consuming of the primary content information item to take a bathroom break, or the user receives a phone call, during which the consumption of the primary content information item needs to be suspended, or the IPTV service provider needs to insert further content in the current session, such as premium content or an advertisement break.

Upon a user request, the end-user equipment sends a pause-command message to the Media Function (MF) to temporarily halt the current session. The MF includes the MCF and the MDF, introduced above. The MF is part of an IPTV environment that provides IPTV and communication (e.g., VoIP) streaming services. The pause-command can, for instance, be an RTSP PAUSE message. Alternatively, a proxy for the user request may exist, such as an incoming telephone call. Upon the reception of the pause-command message, the MF pauses media delivery and informs the SCF of the PAUSE action, for example, by means of a session notification message, such as a SIP INFO message or a SIP MESSAGE message, optionally containing a Service Action Data update element, which describes that the current session is temporarily halted.

The end-user equipment will request the transmission of the secondary content information item. This request can either be implemented in the current session or implemented in a new session. The request for the delivery of the secondary content information item can be performed with a relevant session initiation message or setup message. For example, as an SIP INVITE message or an RTSP SETUP message, containing a media description, formatted in, e.g., an SDP message, and possibly containing a Service Action Data update element, describing that the content insertion is accepted. This message is transmitted to the SCF and/or MCF. The MCF will then accept the session invite, for instance by means of transmitting an SIP message or an RTSP message to the end-user equipment. This session-accept message from the MCF contains, for example, the URI of the media stream of a secondary content information item. Upon reception of this session-accept message, the end-user equipment starts media delivery, for instance by means of RTSP/RTP streaming. This procedure is described in the Release 2 of the ETSI TISPAN IMS-based IPTV Stage 3 specification (TS 183 063).

The secondary content information item is played out until a suitable moment arrives for resuming the play-out of the primary content information item. Such a moment can be determined, for example, by user input from the end-user in the form of a play-out command. Alternatively, the suitable moment has been determined in advance, as is the play-out time of the one or more secondary content information items. The duration of the pause can be predicted, based on a history of, e.g., previous occasions on which the playing-out of a primary content information item was temporarily suspended. For example, the history is formed by an aggregate of past events, e.g., previous user-interactions with the end-user equipment that caused the playing-out of a primary content information to be suspended, lengths of pauses in the playing-out of past primary content information items invoked by sources other than the end-user. Based on the prediction of the length of the pause, the one or more secondary content information items are selected for play-out during the pause. Standard session termination procedures, as described for example in Release 2 of the ETSI TISPAN IMS-based IPTV Stage 3 specification (TS 183 063), can be employed.

Upon the end of the pause period, the end-user equipment transmits a play-command message to the MF, such as an RTSP PLAY message, in order to resume the current session. Upon the reception of the play-command message, the MF resumes media delivery and informs the SCF of the resume action, for example, by means of a session notification message, such as an SIP INFO message or an SIP MESSAGE message. The session notification message contains, optionally, a Service Action Data update element, which describes that the current session of playing out the primary content information item has been resumed.

The SCF uses the session notification messages to determine the length of the time period between a first moment of receiving the request to temporarily halt the playing-out of the current primary content information item and a second moment suitable for resuming the play-out of the current primary content information item at the end-user equipment. Alternatively, the SCF parses corresponding SIP messages sent between the SCF and the end-user equipment, to determine the length of delay, or the SCF parses other messages being used (e.g., in HTTP, XML etc.).

In order to provide a prediction of the length of the pause, e.g., based on a history for this end-user, the SCF itself may comprise a Pause Length Predictor, e.g., implemented in software. Alternatively, the SCF is connected to an SIP application server or other application server logic that implements the Pause Length Predictor. Alternatively, the end-user equipment itself comprises the Pause Length Predictor.

Upon a pause request, one or more secondary content information items are rendered by the end-user equipment. The selection of the secondary content information items is based on the predicted length of the delay until the currently suspended session of the primary content information item resumes. The one or more secondary content information are selected so that the play-out time of the selected one secondary content information item covers the predicted length of the pause, or so that the aggregate play-out time of the selected multiple secondary content information items, played-out back-to-back, covers the predicted length of the pause.

The SCF uses the Pause Length Predictor to predict the length of the pause, starting with a command to suspend the playing-out of the primary content information item and ending with the estimated moment suitable for the end-user to resume the playing-out of the primary content information in the current session. The Pause Length Predictor uses the history of past events that invoked pauses and, optionally, additional criteria such as, e.g., an identity of the end-user, a semantic content of the primary content information item of the suspended session, the geographic location of the end-user equipment and the local time at the geographic location, etc.

The SCF uses the Pause Length Selector to select one or more secondary content information items for being played out during the pause. The introduction of the one or more secondary content information items is referred to as "ContentInsert" in IMS terminology. The one or more secondary content information items thus processed are referred to as ContentInsert items in IMS terminology. Upon selection of the one or more secondary content information items, based on the predicted length of the pause, the SCF sends a session notification message to the end-user equipment, such as an SIP MESSAGE request or an SIP INFO request with an IPTV notification content type.

The session notification message comprises, amongst others, a pointer, e.g., a URI (Uniform Resource Identifier), to the secondary content information item, information regarding the play-out time (e.g., start-time; stop-time and/or duration) of the secondary content information item, and a reason for introducing the secondary content information item (i.e., the reason for the content insertion, referred to as e.g. "ContentInsertionReason"). The reason stated is, e.g., a commercial break, an incoming telephone call, or a pause invoked on request of a governmental institution, etc.

The information regarding the play-out time of the one or more secondary content information items is described, e.g., in a content insertion time element (e.g., "ContentInsertionTime") that comprises information about the start-time (referred to as "a start-time element", e.g. "ContentInsertionStartTime"), and information about the duration of the play-out of the one or more secondary content information items (referred to as "a duration element", e.g., "ContentInsertionDuration").

Upon reception of the session notification message, the end-user equipment parses the message, and transmits a session set-up message, such as an SIP INVITE message, to the SCF in order to indicate that the end-user equipment accepts the content insertion. The one or more inserted secondary content information items are rendered until one of the following events occur. A first event is that the Content Insertion Duration interval expires, which may result in a play-command, e.g., an RTSP play command, for resuming the playing out of the primary content information item. A second event is that the end-user explicitly sends a command to the end-user equipment, that the session of playing-out the primary content information item is to be resumed. Thereupon, the end-user-equipment transmits a play command message, e.g., an RTSP play message to the SCF, indicating that the session of playing-out the primary content information item is to be resumed. Alternatively, the SCF indicates, by means of SIP messages, that the session can be resumed.

The feature relating to the content insertion at the end-user equipment, described in clauses 5.1.13 and 5.312.1 of TS 183 063, allows for inserting one or more content information items by setting up a new session. When content information items are to be inserted, the SCF notifies the end-user equipment by means of sending a notification. This notification contains a "ContentInsertionInfo"-element, with several sub-elements.

Some of these sub-elements describe the content insertion time, i.e., the duration of the play-out of the inserted content information item. The support of content information insertion at the end-user equipment is not restricted to insertion controlled by the end-user only. The content insertion may be triggered by an explicit user request, for example, a command resulting from the end-user pressing the "pause"-button on his/her remote control device, that halts the playing-out of a primary content information item provided in a CoD service implemented in an IMS-based IPTV network.

The inventors propose a "ContentInsertionReason"-element for use in the notification in order to let the end-user equipment determine the appropriate handling of the inserted secondary content information item.

In the following, a procedure is proposed for content insertion at the end-user equipment side, using terminology borrowed from the IMS specifications.

When receiving the SIP MESSAGE request with Content-type set to "application/vnd.etsi.iptvnotification+xml", the end-user equipment sends back a "200" (OK)-response without any message body. A "200"-response is a standardized code used by SIP for communicating a response to indicate a successful event. The end-user equipment then extracts the parameters from the received SIP MESSAGE message body, and verifies that the "NotificationReason" is "ContentInsertion". The end-user equipment checks the local device for the support of content insertion, and extracts further sub-elements from the message body of the "ContentInsertionInfo"-element as follows. The "SessionId"-element in the message body is used by the end-user equipment to identify the on-going session that is required for content insertion. The "ContentInsertionReason"-element in the message body describes the reason for ContentInsertion. Examples are "Advertising", "Emergency Alert", "Paused Content", "Incoming Call" and "Generic". The end-user equipment handles the content insertion based on the reason for the content insertion. Additionally, the end-user equipment may reject the content insertion based on criteria such as local resource availability, bandwidth availability, etc.

The "ContentInsertionTime"-element contains two sub-elements: a "ContentInsertionStartTime"-element and a "ContentInsertionDuration"-element.

The "ContentInsertionStartTime"-element in the message body indicates the start time of the playing out of the inserted content information item. If the start time is set earlier than the present time indicated by the system clock of the end-user equipment, the end-user equipment ignores the whole MESSAGE message as if it were sent in error. If the start time is set later than the present time indicated by the system clock, the end-user equipment sets up a timer to wait for the triggering of the content insertion handling. In case the message body does not carry a "ContentInsertionStartTime"-element, or if the timer for the content insertion triggering has expired, the end-user equipment performs the content insertion immediately.

The "ContentInsertionDuration"-element in the message body indicates the duration of the play-out of the one or more inserted content information items.

If the message body carries a "MulticastContent"-element, the end-user equipment initiates an SIP INVITE request as described in clause 5.1.3.1, where the first BCServiceID that the end-user equipment attempts to join, is set to the one extracted from the "MulticastContent"-element.

If the message body carries a "UnicastContent"-element, the end-user equipment initiates an SIP INVITE request, where the Request-URI in the request includes the one extracted from the "UnicastContent"-element.

The SIP INVITE request initiated by the end-user equipment is a multi-body message. Part of the message is configured according to the procedures for BC service in section 5.1.3 for multicast content insertion and the procedures for CoD service in section 5.1.4 for unicast content insertion, with the following additional Service Action Data information: "IPTVActionDataCommand" is set to "Notify"; "Notify" is set to "IPTVContentInsertionActionData"; "IPTVContentIdentifer" is set to the content identifier of the ongoing session of the primary content information item, e.g., the BCserviceID, the CoD content identifier, etc.; "InsertedContentIdentifier" is set to the content identifier of the secondary content information item that is to be inserted into the ongoing session; and the "InsertionStatus" element is present and set to "Accepted".

Since the SIP message body contains two kinds of data type (SDP and XML), the Content-Type Header of the SIP INVITE message is set to "multipart/mixed". That is, the SIP message body comprises a content part in SDP format and another content part in XML format. In addition, a boundary parameter value is included in the Content-Type header. Furthermore, a respective Content-Type header is set at the beginning of a respective one of the content part in SDP format and the other content part in the XML format. For the content part formatted in SDP, the Content-Type header is set to "application/sdp". For the content part formatted in XML, the Content-Type header is set to "application/vnd.etsi.iptv-command+xml".

After the new session has been established, the end-user equipment can still use SIP INFO to update the content insertion SAD information. "SAD" is an acronym in the ETSI-TISPAN jargon. "SAD" stands for "Service Action Data", which relates to status updates. The acronym "TISPAN" stands for "Telecommunications and Internet converged Services and Protocols for Advanced Networking" and refers to a standardization body of ETSI relating to fixed networks and Internet convergence. As to the use of SIP INFO messages: in the cases wherein, for example, the content insertion is rejected, or has begun, ended, failed, etc, the end-user equipment can also send SIP INFO to the SCF reporting the insertion status, with the "InsertionStatus"-element set to "Rejected", "Started", "Finished" and "Failed", respectively.

The implementation of the end-user equipment determines how to relate the session, which is to be started for fetching the one or more indicated secondary content information items, with the session of the playing-out of the primary content information item, into which the one or more secondary content information items are to be inserted. The PSCID (Personal Service Composition (PSC) identifier) may be used for correlating these two sessions. For PSC see, e.g., Draft ETSI RTS 182 027 V3.3.4. (2009-10), section 8.22 "Personalized Service Composition (PSC) procedures".

As to the content insertion at the side of the end-user equipment, the following is remarked.

The SCF checks the user-subscription data in order to validate whether the user accepts the content insertion service. The SCF may also get the session-related information, e.g., the SIP dialog information as specified in RFC 4235.

The SCF sends a SIP MESSAGE message to the end-user equipment using notification procedures. The contents of the request message body are as follows. The "NotificationReason" is set to "ContentInsertion". The "MessageSender" is not included. The "ContentInsertionInfo"-element is included and comprises: a "SessionId"-element that is set to the Call-ID of the on-going session; a "ContentInsertionReason"-element that describes the reason for ContentInsertion; and a "ContentInsertionTime"-element.

Examples of the reason for ContentInsertion are "Advertising", "Emergency Alert", "Personalized Service Composition", "Incoming Call", and "Generic", as mentioned earlier. The "ContentInsertionTime"-element contains two sub-elements. A first sub-element is a "ContentInsertionStartTime"-element that, if present, is set to the timestamp, indicative of the exact time, from which on the secondary content information item is to be inserted into the primary content information item. The absence of "ContentInsertionStartTime" implies that the insertion is to be executed immediately. A second sub-element is a "ContentInsertionDuration"-element in the message body. The "ContentInsertionDuration" is set to the duration of the play-out time of the secondary content information item inserted. The SCF can determine the duration on the basis of, e.g., the expected or predicted duration, the identify of the end-user, the semantic content of the primary content information item being played-out in the ongoing session, the geographic location of the end-user equipment, and its local time. In the case of content insertion during a pause, the duration can be derived or predicted from the service state history information or other available statistical information.

If the secondary content information item is delivered by multicast, the message body includes a "MulticastContent"-element and carries the BCServiceID, through which the end-user equipment identifies the secondary content information item.

Figure 6:
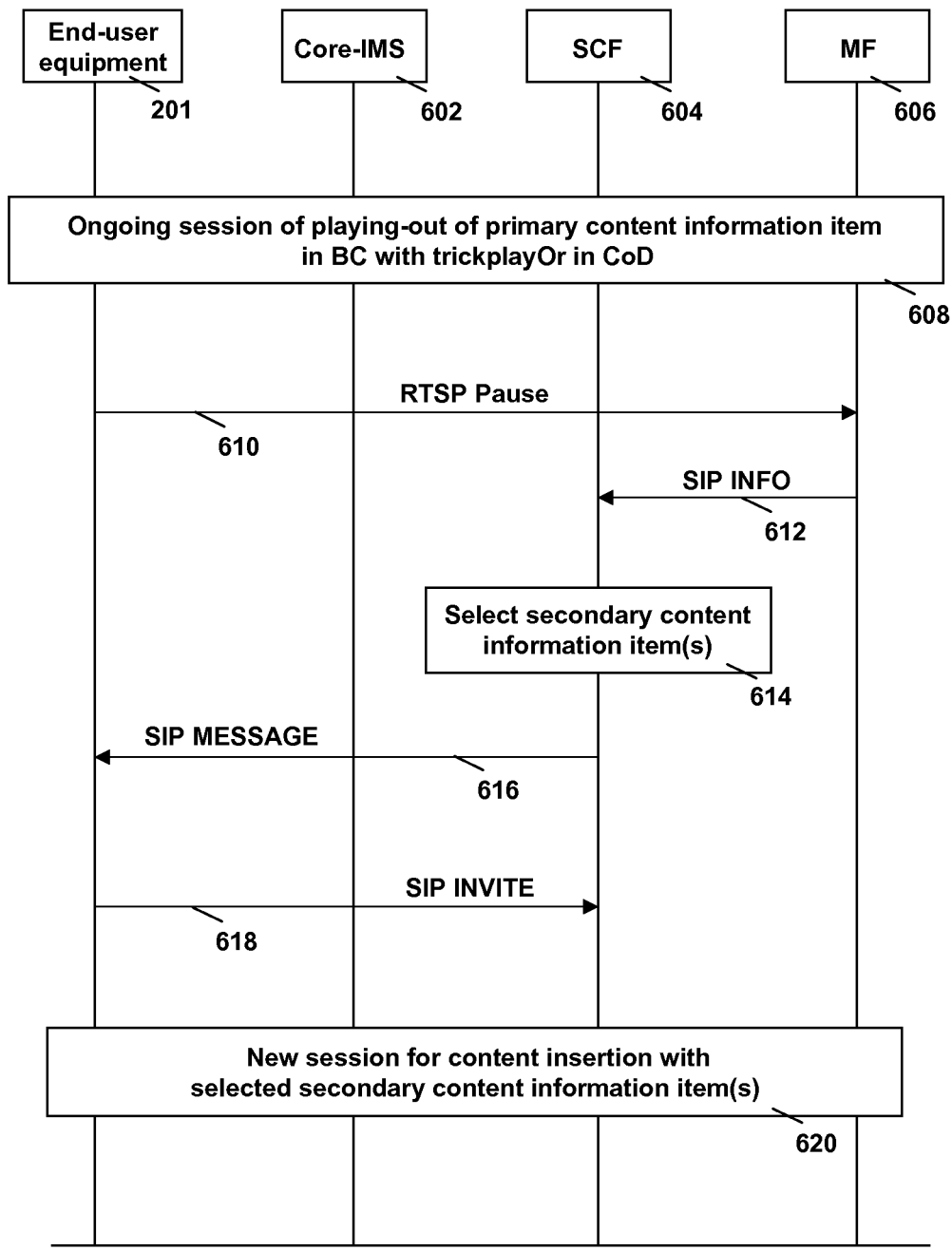
FIG. 6 is a signal flow diagram illustrating an embodiment of the invention relating to pausing the playing out of a primary content information item and playing out one or more secondary content information items during the pause.

FIG. 6 is a signal flow diagram illustrating an example 600 of above process of pausing the playing out of a primary content information item and playing-out one or more secondary content information items during the pause.

The signal flow illustrated in the diagram involves the end-user equipment, also referred to earlier as the end-user's home equipment 201, the Core-IMS 602, the SCF 604 and the MF 606. As known, a Core IMS, also referred to as the IP Multimedia Core Network is a collection of different functions, linked by standardized interfaces, which grouped together form a single IMS administrative network. The SCF and the MF have been introduced above.

The process 600 starts with an ongoing session 608 between the end-user equipment 201 and the MF 606, wherein a primary content information item is being played-out in BC with trickplay or in CoD.

In a step 610, the end-user equipment 201 sends an RTSP PAUSE message to the MF 606.

In a step 612, the MF 606 informs the SCF 604 with an SIP INFO message of the pause invoked during the playing-out of the primary content information.

In a step 614, the SCF 604 selects the one or more secondary content information items suitable for being played-out at the end-user equipment 201 during the pause. The duration of the pause is predicted and the one or more secondary content information items are selected so as to have their aggregate play-out time of a length equal to the estimated or predicted duration of the pause.

In a step 616, the SCF 604 sends a notification to the end-user equipment 201 with an SIP MESSAGE message, in order to notify the end-user equipment 201 of the content insertion.

In a step 618, the end-user equipment 201 sends an SIP INVITE message to the SCF 604 for initiating a new session for the playing-out of the selected one or more secondary content information items.

In a step 620, the new session starts with the playing-out of the selected one or more secondary content information items.

Other Usage Scenarios

Other feasible usage scenarios are the following, not illustrated in the drawing. A further scenario relates to a user interacting with a cash dispenser, also referred to as an automated teller machine (ATM). The ATM's operation is controlled by a local data processor that interacts with a server via a data network. The user has a card with a magnetic strip or with an embedded semiconductor chip that stores the card number, expiration date, etc. The user inserts the card into the card reader of the machine and enters his/her PIN via a physical keyboard or touch screen. The card reader reads the data stored in the card and the machine transmits the user input, i.e., this data and the PIN, via a secure data network to a secure server. The secure server then checks the validity of the data and PIN. For example, the server checks whether the PIN entered is associated with the card number read, the status of the card, the balance on the account, etc. Upon validation, the server controls the machine to present to the user primary content information in the form of a sequence of dialog boxes. The dialog boxes enable the user to navigate through a menu for entering via the keyboard or touch screen the amount of money to withdraw from the account, for confirming or editing the request, for requesting a printed receipt, etc. Thereafter, the machine transfers the requested amount from a secure compartment to the user interface of the machine where the user can physically withdraw a number of bills representative of the amount requested. The verifying at the server and the fetching of the bills from the secure compartment may last some time, which is perceived by the user as an undesirable delay. The concept of system 100 can be applied here to present the user with secondary content information items while waiting for a primary content information item, in the form of the next dialog box or menu option, or a confirmation played out as text at the graphical user interface of the ATM.

A still further scenario relates to conducting a financial transaction with a bank card at, e.g., a store. The store's data processing equipment has a user interface that lets the user enter user input by means of swiping his/her bank card past a magnetic card reader and entering his/her PIN. The swiping of the card enables the card reader to capture the relevant data stored at the card. The equipment then transmits the data captured, together with data indicative of the amount payable, using a secure communication protocol to a secure bank server via the Internet. The server verifies the validity of the data and the balance of the account associated with the card, and returns to the store's equipment data indicative of primary content information. The primary content information item is a validation that is generated on a display monitor of the store's equipment in the form of a message saying "transaction successfully completed". The verification at the server side lasts some time that may be experienced by the user of the card as an undesirable delay. The concept of system 100 can be applied here to present the user with secondary content information items while waiting for the primary content information item. For example, the user is alerted with a text message or a picture to a specific sales offer, or is given the text message "thank you for shopping here", etc.

Consider yet another scenario, wherein the user interacts with user interface 104 in an ongoing dialog with primary resource 102. During a session, the user enters user input via user interface 104, waits for the response from primary resource 102, receives the response in the form of a specific primary content information item, enters a new user input via user interface 104, waits again for a response, receives the response in the form of another primary content information item, etc. As discussed above with reference to various other scenarios, an item of secondary content information is played out to the user during the delay while the user is waiting for the response from primary resource 102. Each time, the user has to wait for the next response during a single session. The secondary content information items played out during the delays within one session are selected, in this scenario, to form different segments of a semantically coherent piece of secondary content information. For example, a segment that is played out during the next delay in a series of consecutive delays in a session, is the next panel of a multi-panel cartoon. The cartoon forms a semantically coherent piece of secondary content information.

Miscellaneous

Referring to the generic concept and scenarios discussed above, primary and secondary resources 102 and 116 can be operated by the same service provider, or can be operated by different service providers, depending on the underlying business model. For example, secondary resource 116 is created and maintained by a service provider different from the service provider maintaining and supplying the primary content information. This model is relevant if the user is to perceive the playing out of the secondary content information item as an attractive interlude. The creation of the secondary content information items is therefore preferably delegated to media experts who are capable of creating suitable secondary content information to be played out in the time periods available, that are typically much shorter than the periods wherein the primary content information is being played out. Creating an advertisement or video clip that is catching, requires different skills than making a documentary, a movie, a web site, etc. For example, each time the user experiences a somewhat longer delay of a couple of seconds, a condensed piece of secondary content information is presented such as: a news flash; a one-liner from an encyclopedia about a randomly selected subject; one of a series of different cartoons.

The user in the context switch scenario discussed with reference to FIG. 3 could subscribe to a dedicated service that provides the secondary content information items as downloads, stored in resource 116 or on a data carrier such as a USB stick that serves as resource 116. In this manner, the secondary content information items can be personalized and/or replaced when desirable.

Resource 116 can also be formed by a collection of end-user equipment of different end-users that are members to a peer-to-peer (P2P) network. Suitable secondary content information items may then be selected from pictures, sound bites, etc., specifically made available for the user by the user's peers. In these manners, a database evolves comprising secondary content information items suitable in practice for the purpose of being played out as interludes within this P2P community.

The invention claimed is:

1. A method of controlling a play-out functionality in a data processing system, wherein the system is operative to provide to a user access to a primary content information item, wherein the system comprises (i) a user interface for enabling a user to enter user input into the system, (ii) a primary module coupled to the user interface and operative to process the user input in a predetermined manner for retrieving, under control of the user input, a primary data item representative of the primary content information item, and (iii) a rendering device configured for receiving the primary data item and for rendering the primary content information item for being played out, the method comprising:
   predicting, based at least in part on information about duration of previous delays in a same usage scenario, a length of a delay between a first moment of the user entering the user input and a second moment suitable for beginning a play out of the primary content information item;
   selecting a specific one of multiple secondary content information items dependent on the predicted length of the delay, wherein the selecting also depends at least on an identity of the user and a semantic content of the primary content information item; and
   controlling a rendering of the specific secondary content information item at the rendering device for play out of the specific secondary content information item during the delay.

2. The method of claim 1, wherein the predicting is also based at least on a parameterized algorithm, the parameterized algorithm comprising domain specific knowledge.

3. The method of claim 1, wherein the primary content information item comprises a program on a channel of a digital television (TV) service provided via a data network.

4. The method of claim 1, wherein the selecting also depends at least on an item selected from the group consisting of:
   a geographic location of the rendering device;
   a geographic location of a primary resource of the primary content information item; and
   a time of the day at the geographic location.

5. Data processing equipment comprising:
   a user interface for enabling a user to enter user input into the equipment;
   a network interface to a data network, the network interface configured for receiving, via the data network and in response to the user input, a primary data item representative of a primary content information item;
   a rendering device configured for receiving the primary data item from the network interface and for rendering the content information item; and
   a secondary module that comprises:
      a delay predictor operative to predict, based at least in part on information about duration of previous delays in a same usage scenario, a length of a delay between a first moment of the user's entering the user input and a second moment suitable for beginning the play-out of the primary content information item for play-out; and
      a selector configured to select a specific one of multiple secondary content information items dependent on the predicted length of the delay, wherein the selector is further configured to select the specific secondary content information item in dependence on an identity of the user and a semantic content of the primary content information item;
      wherein the secondary module is operative to control a rendering of the specific secondary content information item at the rendering device for the play-out of the specific secondary content information item during the delay.

6. The equipment of claim 5, further comprising a resource connected to the selector and configured for storing the multiple secondary data items.

7. The equipment of claim 5, further comprising a digital television with a network interface for receiving, via a data network, the primary content information item in a broadcast on a channel of a digital television (TV) service on the data network.

8. The equipment of claim 5, wherein the selector is further configured to select the specific secondary content information item in dependence on at least one of the items selected from the group consisting of:
   a geographic location of the rendering device;
   a geographic location of a primary resource of the primary content information item; and
   a time of the day at the geographic location.

* * * * *